United States Patent [19]
Yoshiyasu et al.

[11] Patent Number: 5,688,418
[45] Date of Patent: Nov. 18, 1997

[54] METHOD AND APPARATUS FOR LASER CUTTING

[75] Inventors: Shigehiro Yoshiyasu; Masaru Kanaoka, both of Aichi, Japan

[73] Assignee: Mitsubishi Denki Kabushiki Kaisha, Tokyo, Japan

[21] Appl. No.: 392,488

[22] Filed: Feb. 23, 1995

[30] Foreign Application Priority Data

Feb. 24, 1994 [JP] Japan ..................................... 6-026423
Feb. 15, 1995 [JP] Japan ..................................... 7-026619

[51] Int. Cl.⁶ ................................................ B23K 26/00
[52] U.S. Cl. ............................. 219/121.71; 219/121.7; 219/121.72; 219/121.62
[58] Field of Search ......................... 219/121.67, 121.72, 219/121.85, 121.61, 121.62, 121.83, 121.71, 121.7

[56] References Cited

U.S. PATENT DOCUMENTS

| | | | |
|---|---|---|---|
| 5,012,069 | 4/1991 | Arai | 219/121.62 |
| 5,155,328 | 10/1992 | Ikawa | 219/121.83 |
| 5,491,318 | 2/1996 | Sugawara et al. | 219/121.67 |

FOREIGN PATENT DOCUMENTS

| | | |
|---|---|---|
| 61-232085 | 10/1986 | Japan . |
| 1-197084 | 8/1989 | Japan . |
| 0015889 | 1/1990 | Japan ............................ 219/121.72 |
| 2-63692 | 3/1990 | Japan . |
| 3-174995 | 7/1991 | Japan . |
| 3-210981 | 9/1991 | Japan . |
| 3-294078 | 12/1991 | Japan . |
| 4-33788 | 2/1992 | Japan . |
| 4-339588 | 11/1992 | Japan . |
| 5-277773 | 10/1993 | Japan . |

*Primary Examiner*—Mark H. Paschall
*Attorney, Agent, or Firm*—Sughrue, Mion, Zinn, Macpeak & Seas

[57] ABSTRACT

A laser cutting method is provided for laser cutting a workpiece made of a metallic material to form hole having a desired shape, in which many of a second set of laser cutting conditions are different from a set of first laser cutting conditions, in order to avoid a chipping phenomenon when switching laser cutting conditions. The first laser cutting conditions are used for cutting the workpiece up to a predetermined distance short of the end point of the cut. The second set of cutting conditions are used for cutting the workpiece between an end point of the cut along the circumference of the hole, and a point a predetermined distance short of the end point of the cut. The focus position in the second laser cutting conditions is the same as the focus position in the first laser cutting conditions. Moreover, other of the second cutting conditions are the same as corresponding ones of the first set of cutting conditions.

33 Claims, 11 Drawing Sheets

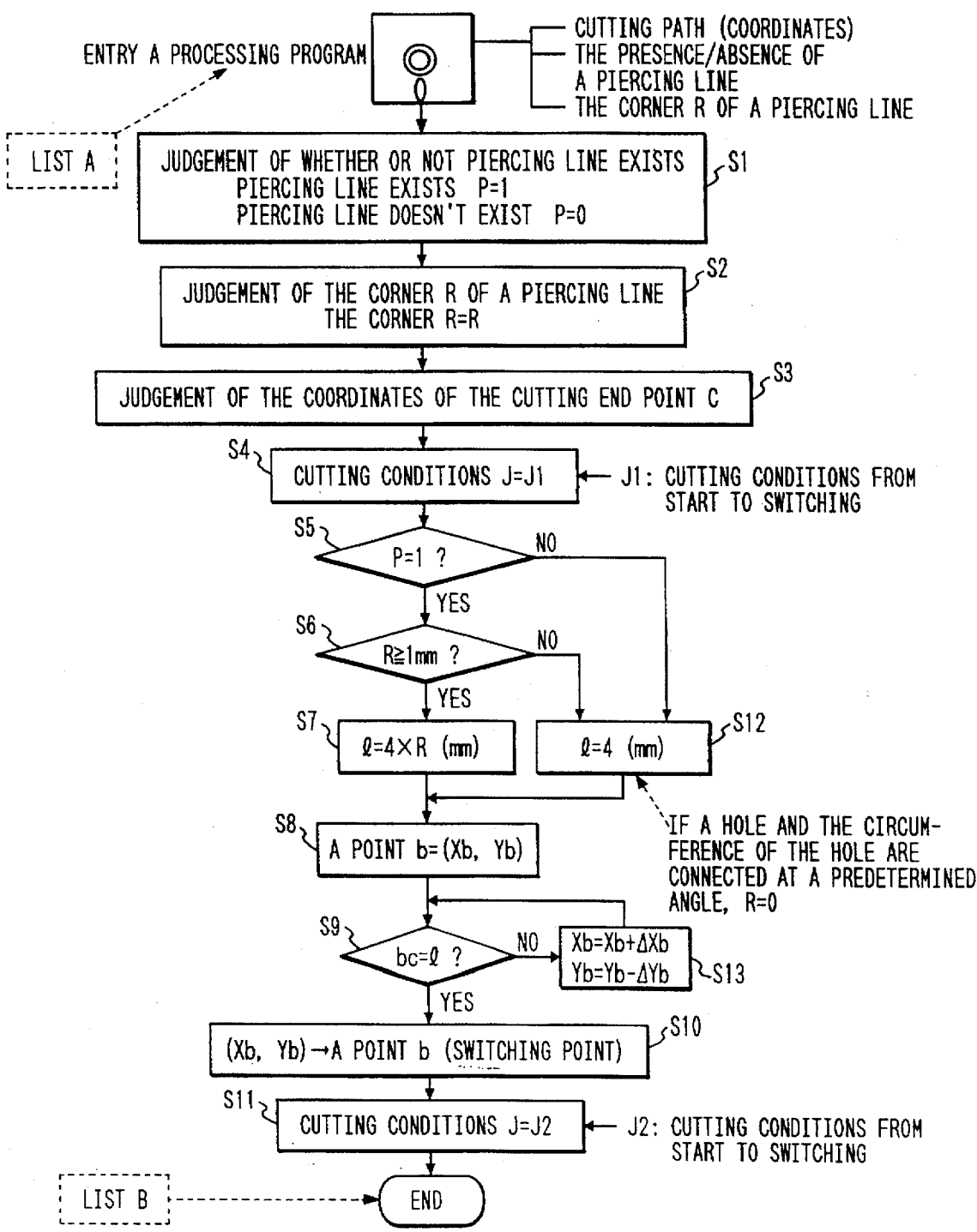

METHOD AND APPARATUS FOR LASER CUTTING

BACKGROUND OF THE INVENTION

The present invention relates to a method and an apparatus for laser cutting a hole in a plate-shaped workpiece made of a metallic material having a relatively large thickness, along a circumference of a desired shape of the hole, e.g., a circle, a square or a triangle, to form a hole having the desired shape in the workpiece. The laser cutting proceeds with settings for second laser cutting conditions for cutting the workpiece between an end point of the cut, that is a cutting end point, on a hole circumference and a point a predetermined distance short of said end point. The second laser cutting conditions are different from those of first laser cutting conditions for cutting the workpiece up to the point which is a predetermined distance short of the end point of the cut on the hole circumference. In particular the invention relates to switching from the first laser cutting conditions to the second laser cutting conditions.

When a steel plate having a comparatively large thickness, e.g., 3.2 mm or more, is to be drilled by a laser, a cutting method currently employed to solve or avoid the problem of a cutting fault which occurs at an end point of the cut along a cutting line, i.e., which occurs as soon as a laser beam has finally returned to a starting point of the cut, is to stop the cutting slightly short of the cutting end point which leaves a joint. However, this method has a disadvantage that a process of removing the joint is ultimately required. To cope with this disadvantage, a cutting method shown in FIGS. 14 and 15 has been presented (see Japanese Laid-Open Patent Publication No. HEI 4-33788).

FIG. 15 illustrates how laser beam output condition parameters, i.e., laser output and pulse duty, and cutting condition parameters, i.e., cutting speed and cutting gas pressure, are controlled at each cutting position (a, b, c, d) shown along a cutting path in FIG. 14.

Namely, in the cutting method shown in FIGS. 14 and 15, the laser output, pulse duty cycle and cutting speed are set to small values in a region of the cut having a small corner radius (e.g., a to b) as shown in FIG. 14, because much of the accumulated heat remains in the base material immediately after the corner radius is cut. The laser output, pulse duty cycle and cutting speed are set to large values in a region of the cut up to a point adjacent to an end point of the cut, along a circumference of the hole (b to c). Further, the laser output, pulse duty cycle and cutting speed are set to small values again for the same reason as for the region of the cut between a to b. The cutting gas pressure is also reduced in a region adjacent to the end point of the cut (c to d), thereby preventing a cutting fault from arising upon return to the end point of the cut d, i.e., at a position where the laser beam has returned to the starting point b on the circumference of the hole.

FIG. 16 shows the result of cutting a 30 mm-diameter hole in a soft steel material, e.g., SS400, having a thickness of 12 mm which is used as the base material according to the conventional art technique shown in FIGS. 14 and 15. The laser cutting conditions employed in this laser cutting operation are a first set of cutting conditions of a laser output of 1,750 W, pulse peak output of 2,800 W, pulse frequency of 1,300 Hz, duty cycle of 65%, cutting speed of 1,000 mm/min, focus position of +1.5 mm, and cutting gas pressure of 0.7 kg/cm$^2$ for the first part of the cut along the circumference of the hole. For the portion of the cut adjacent to the cutting end point a second set of laser cutting conditions are employed. The second set of laser cutting conditions comprise a laser output of 500 W, pulse peak output of 1,500 W, pulse frequency of 100 Hz, duty cycle of 30%, cutting speed of 100 mm/min, focus position of ±0, and cutting gas pressure of 0.2 kg/cm$^2$ adjacent to the cutting end point.

As is apparent from FIG. 16, although a cutting fault which occurs at position d along the cut where the laser beam returns to the cutting end point can be prevented, large chipping takes place at position c along the circumference of the cut adjacent to the cutting end point where the laser cutting conditions are switched, leading to serious damage to the product.

Further, a cutting method which employs a cutting gas that suppresses an oxidation reaction, typified by dry air or nitrogen gas, adjacent the cutting end point is presented in Japanese Laid-Open Patent Publication No. HEI 4-339588 and Japanese Laid-Open Patent Publication No. HEI 3-210981. However, this method has a disadvantage in that a chipping phenomenon is liable to occur before and after a point where the laser cutting conditions are switched, i.e., at a cutting gas type switching position.

SUMMARY OF THE INVENTION

It is accordingly an object of the present invention to solve the above problems by providing a laser cutting method and apparatus which laser cuts a workpiece made of a metallic material having a comparatively large thickness, e.g., 3.2 mm or more, along a circumference of a hole having a desired shape, to form the hole having the desired shape in the workpiece without chipping, at and adjacent to a cutting end point, with consistently high quality.

The invention provides a laser cutting method for laser cutting a workpiece made of a metallic material to form a desired shape of hole in the workpiece with settings of second laser cutting conditions for cutting the workpiece between a cutting end point on a hole circumference and a point a predetermined distance short of said cutting end point different from those of first laser cutting conditions for cutting the workpiece up to the point the predetermined distance short of the cutting end point on the hole circumference, wherein a focus position in said second laser cutting conditions is set to the same value as the focus position in said first laser cutting conditions, whereby the cutting groove width before and after a laser cutting condition switching position does not tend to change and the workpiece can be cut with high accuracy without chipping occurring adjacent to the cutting end point.

The invention also provides a laser cutting method for laser cutting a workpiece made of a metallic material to form a desired shape of hole in the workpiece with settings of second laser cutting conditions for cutting the workpiece between a cutting end point on a hole circumference and a point a predetermined distance short of said cutting end point different from those of first laser cutting conditions for cutting the workpiece up to the point the predetermined distance short of the cutting end point on the hole circumference, wherein at least one of pulse peak output, cutting gas pressure and focus position in said second laser cutting conditions is set to the same value as at least a corresponding one of pulse peak output, cutting gas pressure and focus position in said first laser cutting conditions, whereby a cutting groove width before and after a laser cutting condition switching position does not tend to change and the workpiece can be cut with high accuracy without chipping occurring adjacent to the cutting end point.

The invention further provides a laser cutting method concerned with the above described features, wherein when said first laser cutting conditions are switched to said second laser cutting conditions, at least one of laser output, pulse frequency, duty cycle and cutting speed in said first laser cutting conditions is reduced in a linear or step pattern so as to be identical to at a least corresponding one of laser output, pulse frequency, duty cycle and cutting speed in said second laser cutting conditions, whereby laser cutting condition switching can be done more smoothly than in the laser cutting method described above, and further, a cutting groove width before and after a laser cutting condition switching position has less of a tendency to change than in the laser cutting method described above and the workpiece can be cut with high accuracy without chipping occurring adjacent to the cutting end point.

The invention additionally provides a laser cutting method with any of the features described above, wherein when the cutting of the hole is started from piercing line 2 provided to be in contact with the circumference of the hole to be formed by laser cutting at an arc of 1 mm or more radius (R), said first laser cutting conditions are switched to said second laser cutting conditions at a circumferential distance of approximately 4×R short of the cutting end point on the hole circumference, whereby hole cutting started from said piercing line can be done within the shortest cutting time, but nonetheless, a cutting groove width before and after a laser cutting condition switching position does not tend to change and the workpiece can be cut with high accuracy without chipping occurring adjacent to the cutting end point.

The invention also provides a laser cutting method with any of the features described above, except for that of a piercing line having an arc with a radius of 1 mm or more, wherein when the cutting of the hole is started from a piercing line 2 provided in contact with the circumference of the hole to be formed by laser cutting at an arc of less than 1 mm radius, from a piercing line connected linearly with the circumference of the hole to be formed by laser cutting at a predetermined angle, or from a point on the hole circumference, said first laser cutting conditions are switched to said second laser cutting conditions a circumferential distance of approximately 4 mm short of the cutting end point on the hole circumference, whereby hole cutting started from said piercing line or hole cutting started from the point on the circumference of the hole can be done within the shortest cutting time, but nonetheless, a cutting groove width before and after a laser cutting condition switching position does not tend to change and the workpiece can be cut with high accuracy without chipping occurring adjacent to the cutting end point.

The invention further provides a laser cutting method with any of the features described above, wherein if the minimum dimension of the hole to be formed by laser cutting is approximately less than or equal to the thickness of the workpiece, the pulse frequency in said second laser cutting conditions is set to approximately 20 Hz or less and the cutting speed in said second laser cutting conditions is set to satisfy the following equation:

$$F \leq w/T = w/(1/fp) = w \cdot fp$$

where
F=cutting speed (mm/sec)
w=diameter of hole to be cut by laser beam (mm)
T=pulse period (sec)
fp=pulse frequency (Hz)

whereby if the minimum dimension of the hole to be formed by laser cutting is approximately less than or equal to the plate thickness of the workpiece, excessive heat generated adjacent to the cutting end point can be minimized, and further, the cutting groove width before and after a laser cutting condition switching position does not tend to change and the workpiece can be cut with high accuracy without chipping occurring adjacent to the cutting end point.

The invention also provides a laser cutting apparatus wherein a piercing line is in contact with the circumference of the hole to be formed by laser cutting at an arc of 1 mm or more radius (R) on the basis of cutting path information, comprising:

means for operating a point of a circumferential distance of approximately 4×R short of the cutting end point on the hole circumference to be a point for switching said first laser cutting conditions to said second laser cutting conditions, and means for automatically allocating said first laser cutting conditions and second laser cutting conditions relative to said switching point determined, whereby it is unnecessary for a programmer to calculate a coordinate of a point for switching the first laser cutting conditions to the second laser cutting conditions by hand and insert it into an NC processing program.

It will further become apparent that the invention provides a laser cutting apparatus, wherein a piercing line is provided in contact with the circumference of the hole to be formed by laser cutting at an arc of less than 1 mm radius (R), or a piercing line is provided connected linearly with the circumference of the hole to be formed by laser cutting at a predetermined angle, or the cutting of the hole is started from a point on the hole circumference, comprising means for operating a point of a circumferential distance of approximately 4 mm short of the cutting end point on the hole circumference to be a point for switching said first laser cutting conditions to said second laser cutting conditions, and means for automatically allocating said first laser cutting conditions and second laser cutting conditions relative to said switching point determined, whereby cutting programs can be generated easily to embody the previously described features.

BRIEF DESCRIPTION OF THE DRAWINGS

FIG. 13 is a flow chart illustrating the operation of a laser cutting apparatus according to a ninth embodiment of the present invention.

DETAILED DESCRIPTION OF THE PREFERRED EMBODIMENTS

Embodiment 1

Figure 1:
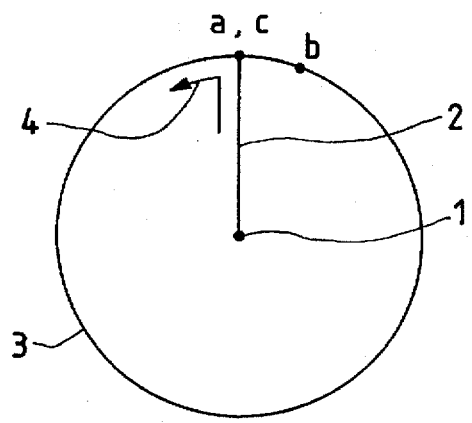
FIG. 1 is a diagram illustrating a laser cutting method according to a first embodiment of the present invention.
Figure 2:
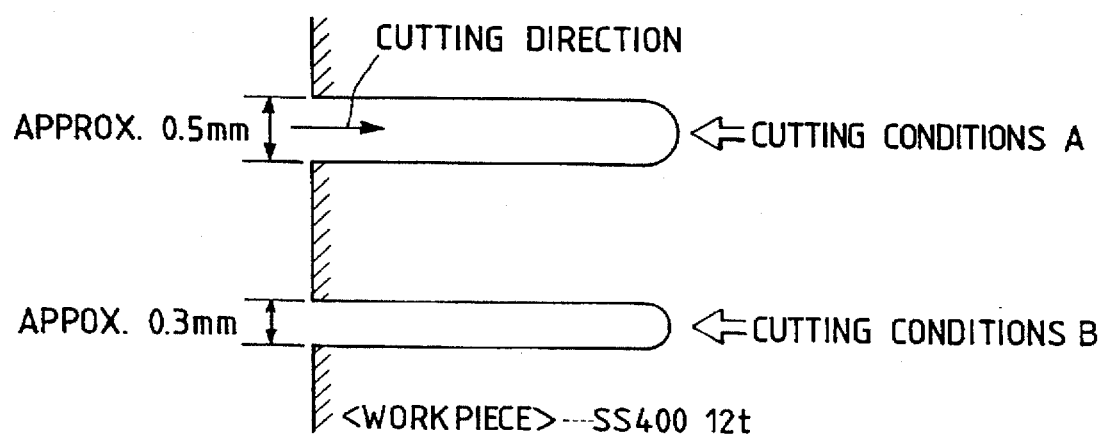
FIG. 2 is a diagram showing the result of a test conducted to check the cause of the disadvantages of the conventional art technique.
Figure 3A:
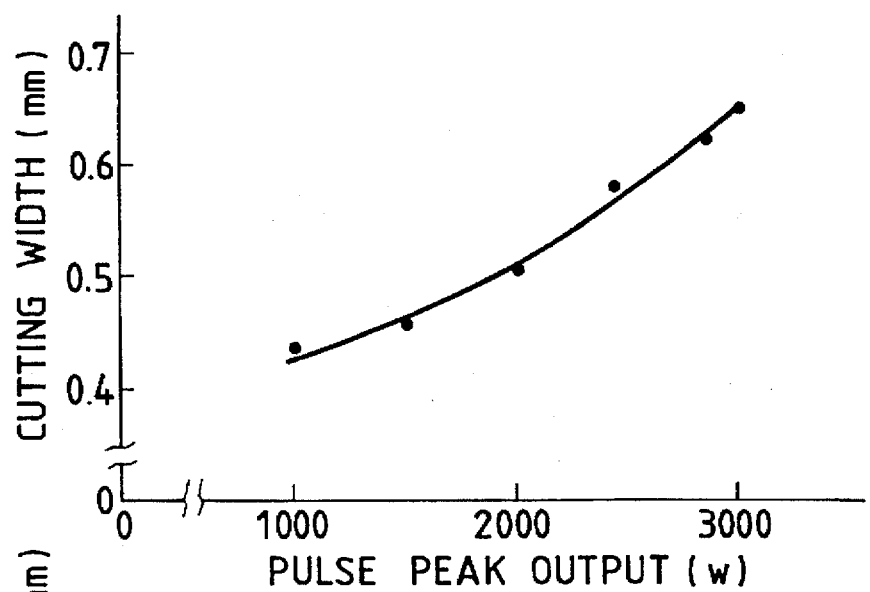
FIGS. 3(a) to 3(c) are diagrams showing the influence of cutting parameters on cutting groove width.
Figure 3B:
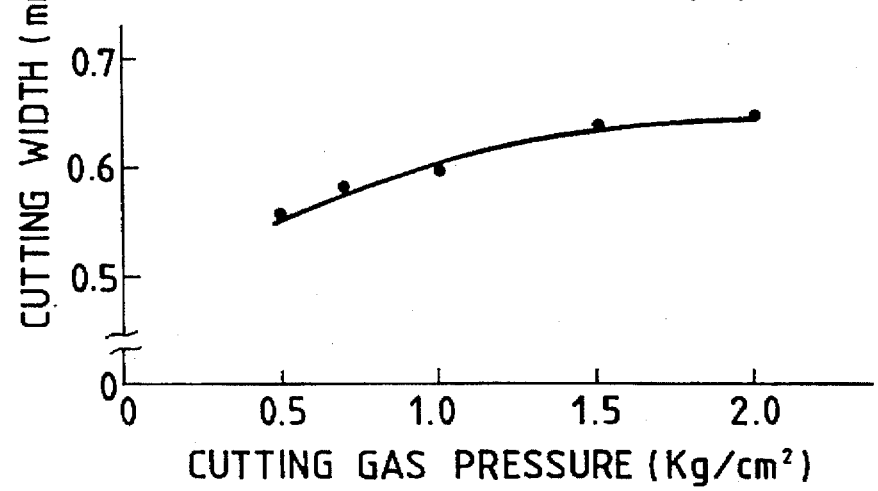
Figure 3C:
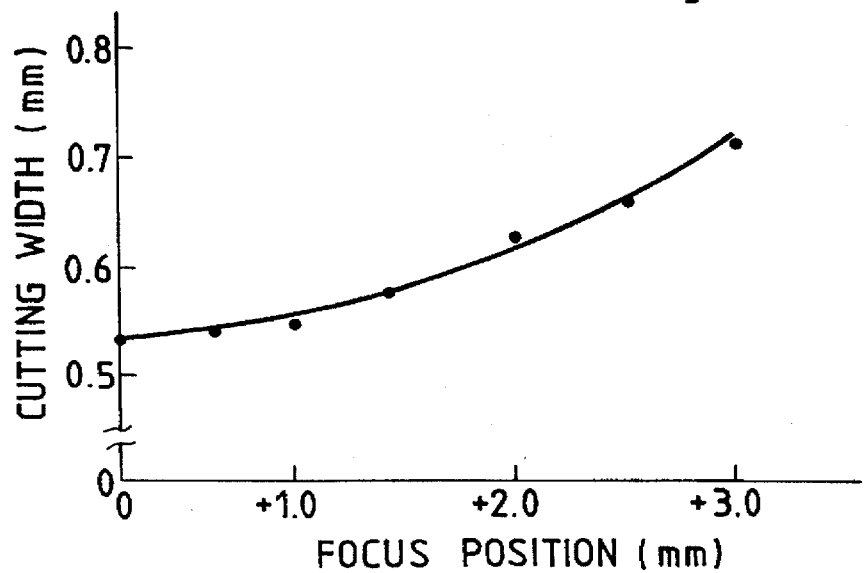
Figure 4:
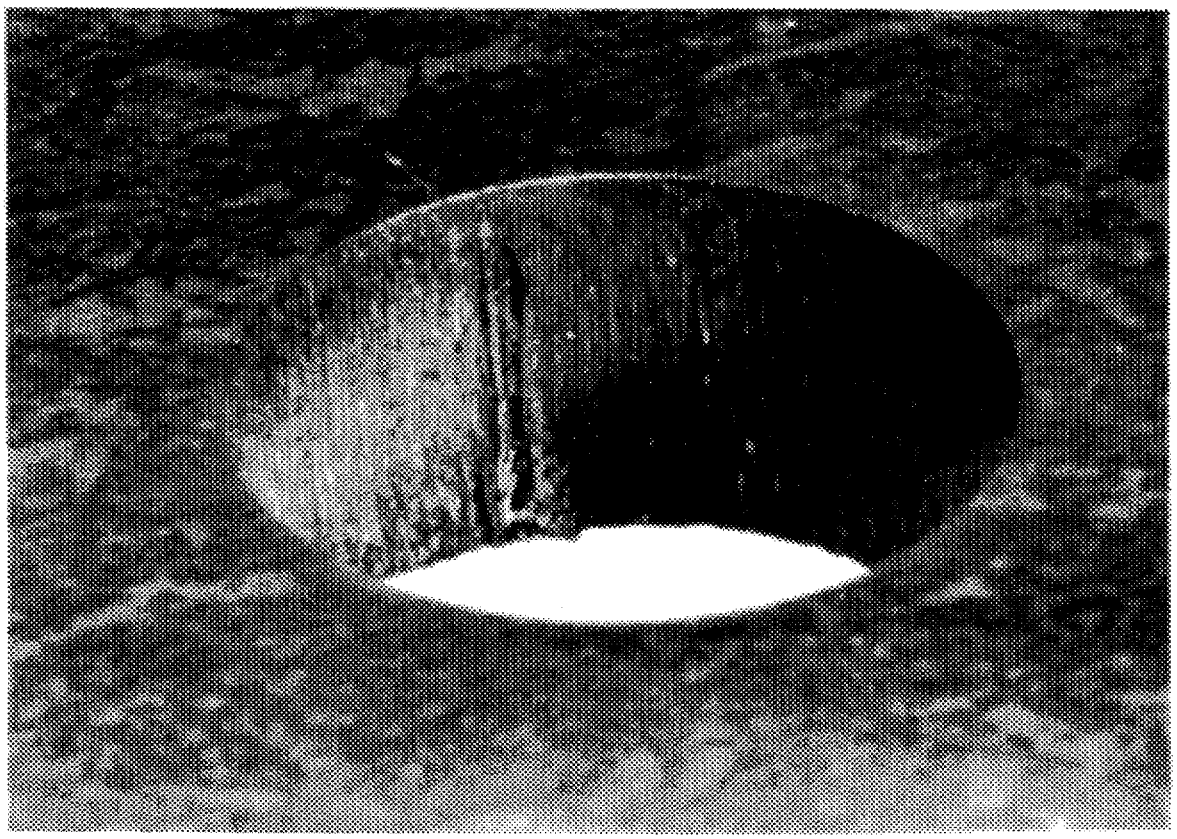
FIG. 4 shows the result of cutting a hole using the laser cutting method according to the first embodiment of the present invention.

A first embodiment of the present invention will now be described with reference to FIGS. 1 to 4. It is to be understood that FIG. 1 illustrates a laser cutting method according to the present embodiment and shows that a piercing line 2 extending from a piercing point 1 is provided in contact with a circumference 3 of a hole to be formed by laser cutting at an arc having a radius of less than 1 mm, the hole is cut from said piercing line 2 in the direction of an arrow 4, and laser cutting conditions are switched at point b during this hole cutting. FIG. 2 shows laser cutting test results for the various cutting conditions. FIG. 3 illustrates the influence of a pulse peak output, cutting gas pressure and a focus position on a cutting groove width, and FIG. 4 shows the result of cutting according to the present embodiment.

In this embodiment, a 30 mm-diameter hole is cut in a soft steel material, e.g., SS400, workpiece having a 12 mm plate thickness.

In FIG. 1, the workpiece is pierced by a laser beam at the piercing point 1 inside the hole to be cut, then the laser cuts along the piercing line 2 up to point a on the circumference, and subsequently cuts, for example, in a counterclockwise direction along the circumference 3 up to point b adjacent to the end point of the cut, or the cutting end point. In this case, laser cutting conditions (hereinafter referred to as the "first laser cutting conditions") were set to a laser output of 1,750 W, pulse peak output of 2,800 W, pulse frequency of 1,300 Hz, duty cycle of 65%, cutting speed of 1,000 mm/min, focus position of +1.5 mm, and cutting gas (nitrogen gas) pressure of 0.7 kg/cm$^2$.

Subsequently, upon arrival at point b the laser cutting conditions were switched to laser cutting conditions (hereinafter referred to as the "second laser cutting conditions") of a laser output of 500 W, a pulse peak output of 2,800 W, a pulse frequency of 20 Hz, a duty cycle of 20%, a cutting speed of 100 mm/min, a focus position of +1.5 mm, and a cutting gas (nitrogen gas) pressure of 0.7 kg/cm$^2$. Thereafter the workpiece was laser cut up to the cutting end point, that is, point c which is at the same position as point a.

That is, the workpiece was laser cut from point b, which is adjacent to the cutting end point, to point c (which is equal to point a) which is the cutting end point on the circumference 3. The pulse peak output, cutting gas pressure and focus position for the second laser cutting conditions (the laser cutting conditions under which the workpiece is laser cut from point b, to the cutting end point c) were the same values as the pulse peak output, cutting gas pressure and focus position for the first laser cutting conditions (that is, the laser cutting conditions under which the workpiece is laser cut from said piercing point 1 to point b adjacent to the cutting end point, respectively). Moreover, the laser output, pulse frequency, duty cycle and cutting speed in the second laser cutting conditions were set to smaller values than the laser output, pulse frequency, duty cycle and cutting speed in the first laser cutting conditions, respectively.

Figure 14:
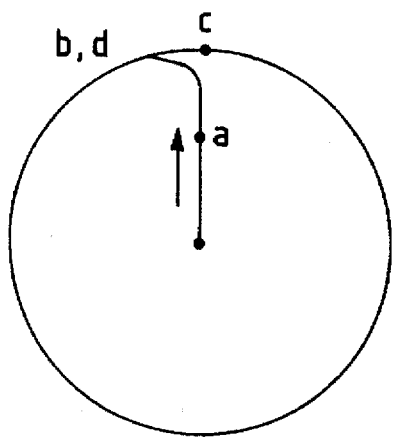
FIG. 14 is a diagram illustrating a conventional laser cutting method.
Figure 15A:
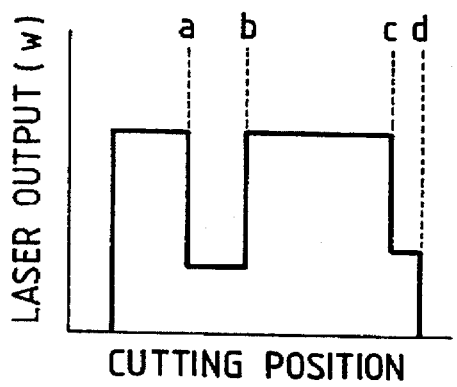
FIGS. 15(a) to 15(d) are diagrams illustrating the conventional laser cutting method.
Figure 15B:
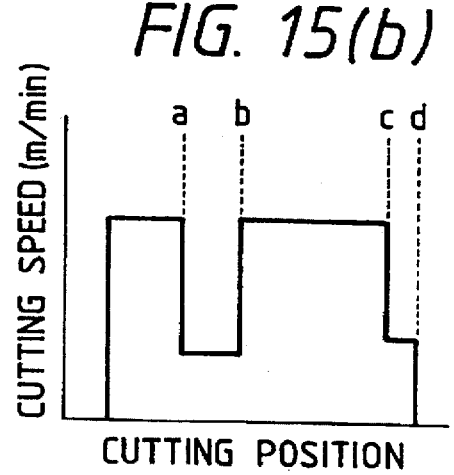
Figure 15C:
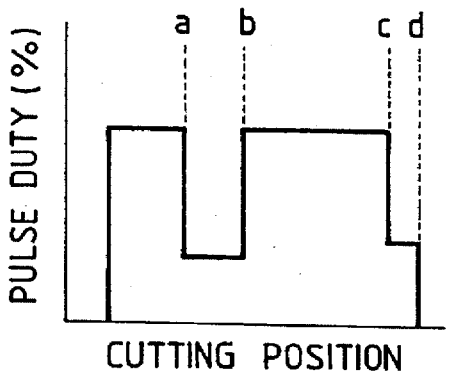
Figure 15D:
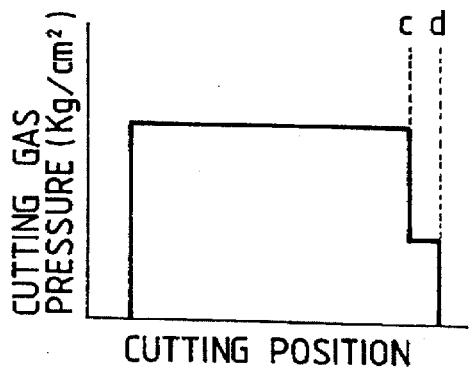
Figure 16:
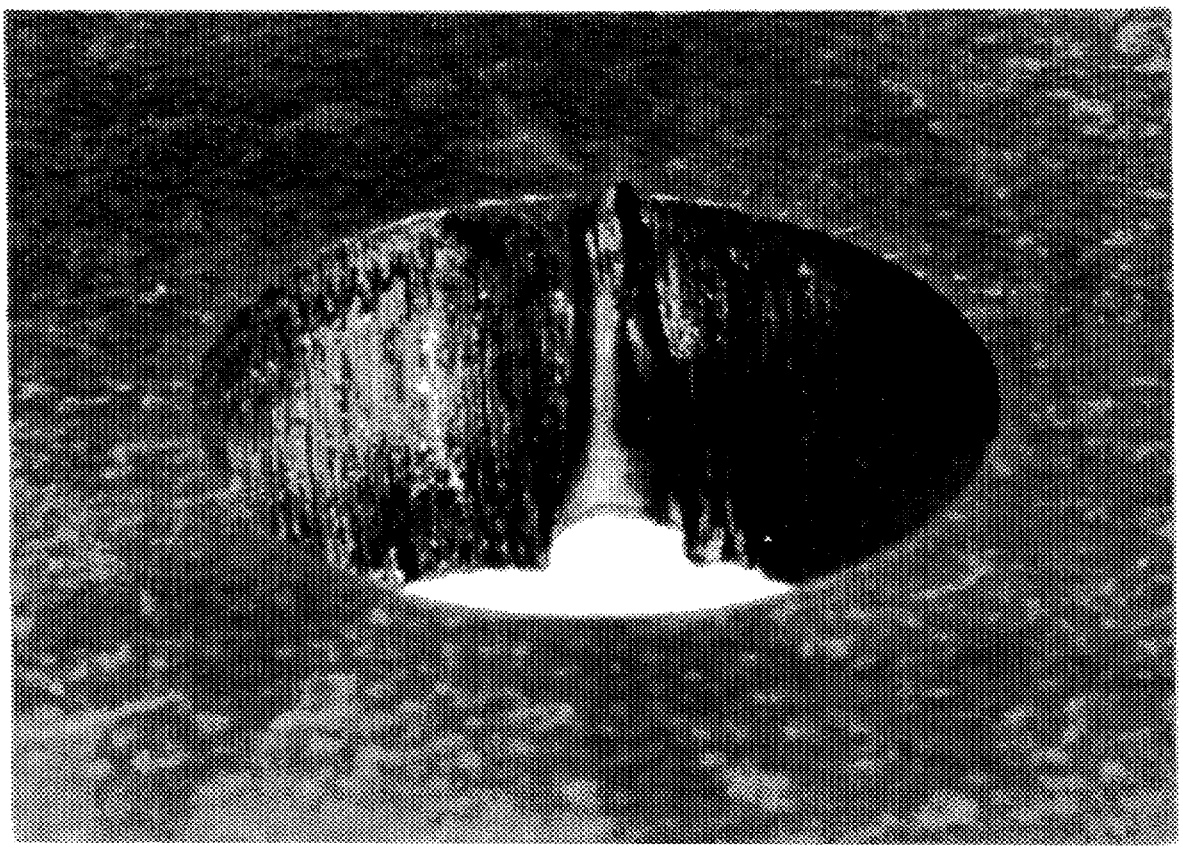
FIG. 16 shows the result of cutting a hole using the conventional laser cutting method.

It is to be understood that said second laser cutting conditions were set as described above for the following reasons:

As described for a conventional techniques, when a hole having a 30 mm diameter is cut in the soft steel material, e.g., SS400, the workpiece having a 12 mm plate thickness, as shown in FIG. 16 according to the conventional technique shown in FIGS. 14 and 15 (i.e., employing the following laser cutting conditions along the majority of the circumference of the cut: laser output of 1,750 W, pulse peak output of 2,800 W, pulse frequency of 1,300 Hz, duty cycle of 65%, cutting speed of 1,000 mm/min, focus position of +1.5 mm, and cutting gas pressure of 0.7 kg/cm$^2$; and employing the following laser cutting conditions for the portion of the cut adjacent to the end point of the cut: laser output of 500 W, the pulse peak output of 1,500 W, the pulse frequency of 100 Hz, the duty cycle of 30%, the cutting speed of 100 mm/min, the focus position of ±0, and the cutting gas pressure of 0.2 kg/cm$^2$), a cutting fault occurs at position d, where the laser beam returns to the cutting end point. A large amount of chipping occurred at the laser cutting condition switching position c adjacent to the cutting end point, at the point in which the laser cutting conditions were switched, doing serious damage to the workpiece. This cutting fault can be prevented.

Since the chipping phenomenon concentrated on the laser cutting condition switching position, the present inventors presumed that the chipping phenomenon adjacent to the cutting end point occurred largely because of the change in the cutting groove width before and after the point at which the laser cutting conditions were switched.

To verify whether or not this presumption was correct, i.e., to check the variation of the cutting groove width before and after the laser cutting condition switching position c, the cutting groove widths were measured after the soft steel material, e.g., SS400, of 12 mm plate thickness, was cut straight under laser cutting conditions A used up to the laser cutting condition switching position c and under laser cutting conditions B used after the laser cutting condition switching position c. FIG. 2 shows the results of the measurement. As is apparent from FIG. 2, it was found that the cutting groove width changed greatly upon switching cutting conditions. In particular after switching to laser cutting conditions B, the cutting groove width which was approximately 0.35 mm was remarkably smaller than the cutting groove width of approximately 0.5 mm, cut under the pre-switching laser cutting conditions A. That is, the inventors' presumption was correct.

Because of the differences in the conventional technique between the pulse peak output, cutting gas pressure and focus position of the laser cutting conditions under which the workpiece is laser cut from point b and the corresponding laser cutting conditions under which the workpiece is cut from the piercing point 1 to point b adjacent to the cutting end point, the present inventors paid attention to the pulse peak output, cutting gas pressure and focus position as factors related to the change of the cutting groove width. FIGS. 3(a) to 3(c) illustrate the influence of the pulse peak output, cutting gas pressure and focus position on the cutting groove width. As is apparent from FIGS. 3(a)–3(c) the cutting groove width is large if the pulse peak output, which is the maximum value of laser output when the pulse is output, is large, and the cutting groove width is small if the pulse peak output is small. Concerning the cutting gas pressure, the cutting groove width is large if the pressure is high, because the effect of removing a molten material from the rear surface of the cut can be increased, and the action is opposite if the pressure is low. Further, if the focus position is large (focus position Z>0), the cutting groove width is large since the laser beam is unfocused from the applied surface, and if the focus position is small (Z≈0), the cutting groove width is small, because the laser beam is tightly focused on the applied surface.

To prevent the workpiece from being chipped adjacent to the cutting end point, the inventors presumed that the cutting groove width could be made constant before and after the laser cutting condition switching position by setting the pulse peak output, cutting gas pressure and focus position in said second laser cutting conditions to the same values as the pulse peak output, cutting gas pressure and focus position in the first laser cutting conditions.

FIG. 4 shows the result of cutting a 30 mm diameter hole under the above laser cutting conditions. As is apparent from FIG. 4, no chipping was found adjacent to the cutting end point and the workpiece could be cut with a high degree of quality.

It is to be noted that although not shown, no chipping was found adjacent to the cutting end point when circular holes having diameters of 16 mm, 20 mm and other diameters, and other holes having complicated shapes, such as a triangle, a square and a rhombus, were cut in soft steel materials, e.g., SS400, of each plate thickness under said laser cutting conditions.

Embodiment 2

Next, a second embodiment will be explained with reference to FIG. 1 and Table 1.

In Embodiment 1, the pulse peak output P, cutting gas pressure G, and focus position Z of the second laser cutting conditions are set to be the same value as the corresponding ones in the first laser cutting conditions, i.e., when switching from the first laser cutting conditions to the second laser cutting conditions, the above three parameters in the laser cutting conditions are kept constant.

In Embodiment 2, when switching the first laser cutting conditions to the second laser cutting conditions, at least one of pulse peak output P, cutting gas pressure G, and focus position Z is/are kept constant.

In Embodiment 2, in FIG. 1, a workpiece is pierced by a laser beam at a pierce point 1 which is located on the inner side of the hole. Thereafter, laser cutting is performed along a pierce line 2 to the point a on the circumference 3 of the hole. Further cutting is performed along the circumference 3 of the hole to the point b which is near the cutting end point. In this case, in which first laser cutting conditions are employed, piercing is performed with the following laser cutting conditions: laser output 1,750 W, pulse peak output 2,800 W, pulse frequency 1,300 Hz, duty cycle 65%, cutting speed 1,000 mm/min, focus position +1.5 mm, cutting gas (nitrogen) pressure 0.7 kg/cm².

Next, the laser cutting operation switches from first laser cutting conditions to various kinds of other laser cutting conditions (hereinafter, the second laser cutting conditions) at point b near the cutting end point on the circumference 3 of the hole. The cutting continues to the cutting end point c (=point a) under the second laser cutting conditions.

The laser cutting conditions from the point b to c (the second laser cutting conditions) are as follows: laser output 500 W, pulse frequency 200 Hz, duty cycle 20 %, cutting speed 100 mm/min. However, values for the pulse peak output P, cutting gas pressure G and focus position Z are, as shown in Table 1. (The last entry in Table 1 shows data corresponding to the First Embodiment.) Any one or two of the values P, G and Z is/are held constant and correspond to condition A (i.e., the first laser cutting conditions are the same as the second laser cutting conditions), and the other conditions are the non-constant conditions B, changed by ±30% relative to the predetermined value (i.e., pulse peak output P0: 2,800 W, cutting gas pressure G0: 0.7 kg/cm² focus position Z0: +15 mm)

Moreover, in Table 1, regarding the varying ratio of the cutting width d/d0, d0 is the cutting width obtained provided when the pulse peak output P, cutting gas pressure G, and focus position Z (i.e., pulse peak output P: 2,800 W, cutting gas pressure G: 0.7 kg/cm², and focus position Z: +1.5 mm) are held constant in the case of cutting from the point a to the point b and in case of cutting from the point b to the point c. Furthermore, d is the maximum value of the cutting width obtained when varying the range of the non-constant conditions B shown in Table 1. d/d0 indicates the ratio of d relative to d0.

In Table 1, when d/d0 ≦ 1.4, O is shown there is no problem in quality, and so "0" is shown in the "evaluation" column. When d/d0 > 1.4, X is shown in the evaluation column, indicating there is a problem in quality.

TABLE 1

| condition A | condition B | varying range of B | d/d0 | evaluation |
| --- | --- | --- | --- | --- |
| Z:Z0 | P, G | P: 0.7P0–1.3P0<br>G: 0.7G0–1.3G0 | 1.34 | O |
| P:P0 | Z, G | Z: 0.7Z0–1.3Z0<br>G: 0.7G0–1.3G0 | 1.53 | X |
| G:G0 | Z, P | Z: 0.7Z0–1.3Z0<br>P: 0.7P0–1.3P0 | 1.71 | X |
| Z: Z0<br>P: P0 | G | G: 0.7G0–1.3G0 | 1.15 | O |
| Z: Z0<br>G: G0 | P | P: 0.7P0–1.3P0 | 1.23 | O |
| P: P0<br>G: G0 | Z | Z: 0.7Z0–1.3Z0 | 1.62 | X |
| Z: Z0<br>P: P0<br>G: G0 | — | — | 1.12 | O |

As a result, as shown in Table 1, the evaluation is X (d/d0>1.4) when the focus position changes in the case of cutting from point a to point b from that in the case of the cutting from point b to point c. The evaluation is O (d/d0≦1.4) when the focus position in the case of cutting from point a to point b is not different from that in the case of cutting from point b to point c.

Finally, when at least focus position Z, from among the pulse peak output P, gas pressure G, and focus position Z, in the case of cutting from point a to point b, is not different from that in the case of cutting from point b to point c, variation of the cutting width about the switching point (the point b) is small, obtaining a good result.

Embodiment 3

Figure 5:
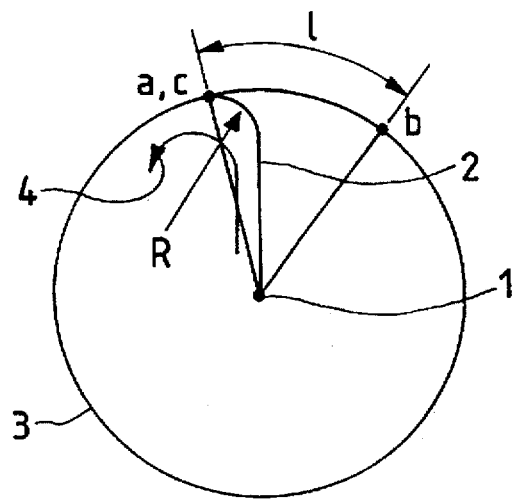
FIG. 5 is a diagram illustrating a laser cutting method according to a third embodiment of the present invention.

A third embodiment of the present invention will now be described with reference to FIGS. 5 and 6. FIG. 5 illustrates a laser cutting method according to the third embodiment and shows a hole cutting operation in which a cutting path is provided with piercing line 2 extending from the piercing point 1 and is in contact with the circumference 3 of the hole to be formed by laser cutting and an arc having a radius 1 mm or more. The hole is cut from said piercing line 2 in the direction of the arrow 4 and the laser cutting conditions are switched at point b during this hole cutting operation.

In this embodiment, a 30 mm-diameter hole is cut in a soft steel material, e.g., SS400, used as a workpiece.

Referring to FIG. 5, as in the first embodiment, the workpiece was pierced by the laser beam at the piercing point 1 inside the hole, then laser cut along the piercing line 2 up to point a on the circumference, and subsequently cut up to point b adjacent to the cutting end point along the circumference 3 of the hole. In this case, the laser cutting conditions (hereinafter referred to as the "first laser cutting conditions") were set as follows: laser output of 1,750 W, pulse peak output of 2,800 W, pulse frequency of 1,300 Hz, duty cycle of 65%, cutting speed of 1,000 mm/min, focus position of 1.5 mm, and cutting gas (nitrogen gas) pressure of 0.7 kg/cm$^2$.

Subsequently, said laser cutting conditions were switched to laser cutting conditions (hereinafter referred to as the "second laser cutting conditions") consisting of: laser output of 500 W, pulse peak output of 2,800 W, pulse frequency of 20 Hz, duty cycle of 20%, cutting speed of 100 mm/min, focus position of +1.5 mm, and cutting gas (nitrogen gas) pressure of 0.7 kg/cm$^2$, at point b adjacent to the cutting end point on the circumference 3, and the workpiece was laser cut up to the cutting end point or point c (=point a).

In particular, the workpiece was laser cut from point b adjacent to the cutting end point to point c (=point a) or the cutting end point on the circumference 3, with the pulse peak output, cutting gas pressure and focus position in the second laser cutting conditions, or the laser cutting conditions under which the workpiece is laser cut from point b adjacent to the cutting end point to point c (=point a) or the cutting end point on the circumference 3, being set to the same values as the pulse peak output, cutting gas pressure and focus position in the first laser cutting conditions, that is the laser cutting conditions under which the workpiece is laser cut from said piercing point 1 to point b adjacent to the cutting end point, respectively, and with the laser output, pulse frequency, duty cycle and cutting speed in said second laser cutting conditions being set to smaller values than the laser output, pulse frequency, duty cycle and cutting speed in said first laser cutting conditions, respectively.

Apart from the above-mentioned items which are identical to those of the first embodiment, said laser cutting was carried out in the present third embodiment with the laser cutting condition switching position b shifted by circumferential distance 1 from the cutting end point c as shown in FIG. 5, and in which the plate thickness of the workpiece where the 30 mm-diameter hole is to be cut (soft steel material, e.g., SS400,) changed from 3.2 mm to 6 mm to 9 mm to 12 mm. Further the radius R (mm) between the piercing line 2 and the point on the circumference 3 was changed.

Figure 6:
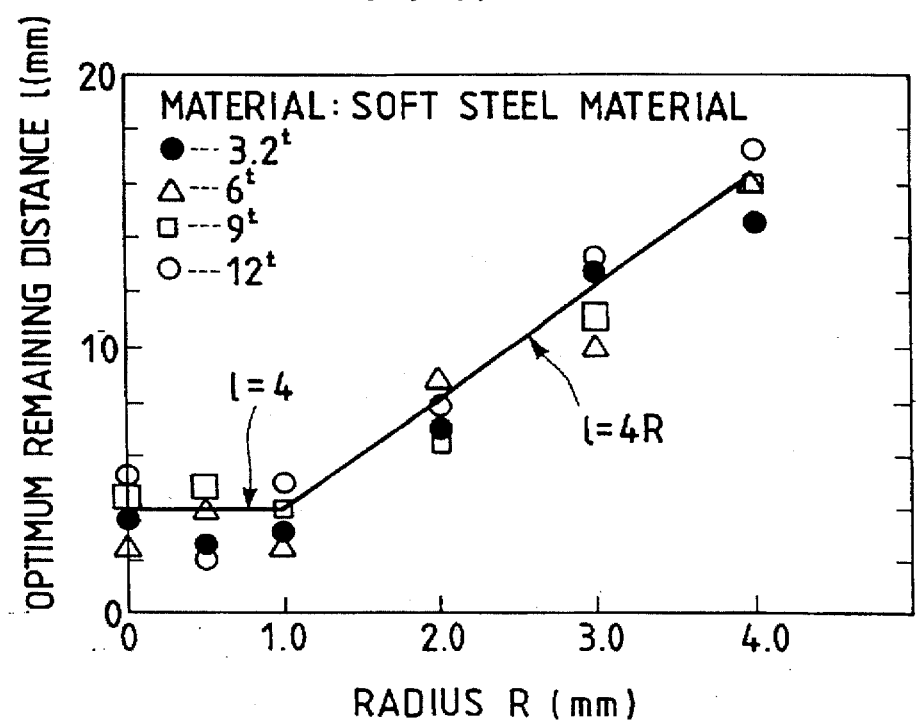
FIG. 6 is a diagram showing an optimum remaining distance for several plate thicknesses according to the third and a fourth embodiment of the present invention.

FIG. 6 shows the results of said cutting. In FIG. 6, the horizontal axis represents the radius R (mm) provided between the piercing line and the point on the circumference, the vertical axis represents the optimum remaining distance 1 thus obtained (i.e., the remaining distance over which the cutting groove width, before and after the laser cutting condition switching position, does not change in the shortest hole cutting time), and mark • indicates the plate thickness of 3.2 mm, mark △ that of 6 mm, mark ☐ that of 9 mm and mark ○ that of 12 mm.

As is apparent from FIG. 6, the result obtained was that the optimum remaining distance (i.e., remaining distance over which the cutting groove width, before and after the laser cutting condition switching position, does not change in the shortest hole cutting time) in a region where R≧1 mm was approximately 1 (mm)=4×R (mm).

It is to be noted that though not shown, no chipping was found adjacent to the cutting end point under the following conditions: the optimum remaining distance was approximately set to 1 (mm)=4×R (mm) when circular holes having diameters of 16 mm, 20 mm and other diameters, and other holes of complicated shapes, such as a triangle, a square and a rhombus, were cut in soft steel materials, e.g., SS400, for each plate thickness under said laser cutting conditions in which the hole cutting has a cutting path provided with the piercing line 2 extending from the piercing point 1 and which is in contact with the circumference 3 of the hole formed by the laser cut at an arc having the radius R of 1 mm or more.

Embodiment 4

Figure 7:
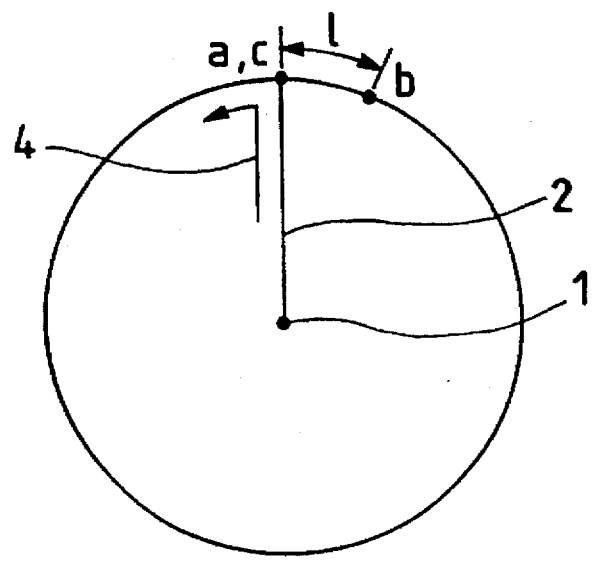
FIG. 7 is a diagram illustrating a laser cutting method according to the fourth embodiment of the present invention.

A fourth embodiment of the present invention will now be described with reference to FIGS. 6 and 7. FIG. 7 illustrates a laser cutting method according to the present fourth embodiment and shows that in hole cutting provided with the piercing line 2 which extends from the piercing point 1 and is in contact with the circumference 3 of a hole to be formed by laser cutting at an arc having the radius R of less than 1 mm, or in hole cutting having a cutting path provided with the piercing line 2 with no arc set from the piercing point 1 to the circumference 3, the hole is cut from said piercing line 2 in the direction of the arrow 4 and the laser cutting conditions are switched at point b during this hole cutting.

In this embodiment, a 30-mm hole is cut in a soft steel material, e.g., SS400, used as a workpiece.

Referring to FIG. 7, as in the first embodiment, the workpiece was pierced by the laser beam at the piercing point 1 inside the hole, then laser cut along the piercing line 2 up to point a on the circumference, and subsequently cut up to point b adjacent to the cutting end point along the circumference 3. In this case, the laser cutting conditions (hereinafter referred to as the "first laser cutting conditions") were set as follows: laser output of 1,750 W, pulse peak output of 2,800 W, pulse frequency of 1,300 Hz, duty cycle of 65%, cutting speed of 1,000 mm/min, focus position of +1.5 mm, and cutting gas (nitrogen gas) pressure of 0.7 kg/cm$^2$.

Subsequently, said laser cutting conditions were switched to laser cutting conditions (hereinafter referred to as the "second laser cutting conditions") consisting of: laser output of 500 W, pulse peak output of 2,800 W, pulse frequency of 20 Hz, duty cycle of 20%, cutting speed of 100 mm/min, focus position of +1.5 mm, and cutting gas (nitrogen gas) pressure of 0.7 kg/cm$^2$ at point b adjacent to the cutting end point on the circumference 3, and the workpiece was laser cut up to the cutting end point or point c (=point a).

In particular, the workpiece was laser cut from point b adjacent to the cutting end point to point c (=point a) or the cutting end point on the circumference 3, with the pulse peak output, cutting gas pressure and focus position in the second laser cutting conditions, or the laser cutting conditions under which the workpiece is laser cut from point b adjacent to the cutting end point to point c (=point a) or the cutting end point on the circumference 3, being set to the same values as the pulse peak output, cutting gas pressure and focus position in the first laser cutting conditions, or the laser cutting conditions under which the workpiece is laser cut from said piercing point 1 to point b adjacent to the cutting end point, respectively, and with the laser output, pulse frequency, duty cycle and cutting speed in said second laser cutting conditions being set to smaller values than the laser output, pulse frequency, duty cycle and cutting speed in said first laser cutting conditions, respectively.

Apart from the above-mentioned items which are identical to those of the first embodiment, said laser cutting was carried out in the present forth embodiment with the laser cutting condition switching position b shifted by circumferential distance 1 from the cutting end point c in FIG. 7 and the plate thickness of the workpiece, where the 30 mm-diameter hole is to be cut (soft steel material, e.g., SS400,), changed from 3.2 mm to 6 mm to 9 mm to 12 mm, and further in the laser cutting path provided with the radius R (mm) of less than 1 mm between the piercing line 2 and the point on the circumference 3, with said R changed.

FIG. 6 shows the results of said cutting. In FIG. 6, the horizontal axis represents the radius R (mm) provided between the piercing line ahd the point on the circumference, the vertical axis represents the optimum remaining distance 1 thus obtained (remaining distance over which the cutting groove width before and after the laser cutting condition switching position does not change in the shortest hole cutting time), and mark • indicates the plate thickness of 3.2 mm, mark Δ that of 6 mm, mark □ that of 9 mm and mark ○ that of 12 mm.

As is apparent from FIG. 6, the result obtained was that the optimum remaining distance (remaining distance over which the cutting groove width before and after the laser cutting condition switching position does not change in the shortest hole cutting time) in a region where R<1 mm was approximately 1=4 (mm).

It is to be noted that though not shown, no chipping was found adjacent to the cutting end point if the optimum remaining distance was set to approximately 1=4 mm when circular holes having diameters of 16 mm, 20 mm and other diameters and other holes of complicated shapes, such as a triangle, a square and a rhombus, were cut in soft steel materials, e.g., SS400, of each plate thickness under said laser cutting conditions in the hole cutting, in which the piercing line 2 extends from the piercing point 1 and is in contact with the circumference 3 of the hole formed by the laser cut, the piercing line 2 forming an arc having a radius R of less than 1 mm, or in the hole cutting having a cutting path in which the piercing line 2 is connected to the circumference 3 with no arc set from the piercing point 1.

Embodiment 5

A fifth embodiment of the present invention will now be described with reference to FIGS. 8 and 9. It is to be understood that FIG. 8 illustrates a laser cutting method according to the present fifth embodiment and shows that in hole cutting having a cutting path which is not provided with the so-called piercing line and is started from a point on the hole circumference 3, the hole is cut from said piercing point 1 (point a) in the direction of the arrow 4 and the laser cutting conditions are switched at point b during this hole cutting.

In this embodiment, a 30 mm-diameter hole is cut in a soft steel material, e.g., SS400, used as a workpiece.

Figure 8:
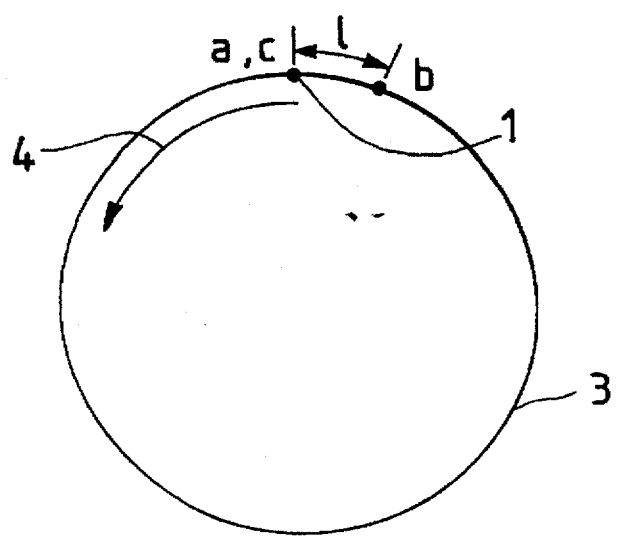
FIG. 8 is a diagram illustrating a laser cutting method according to a fifth embodiment of the present invention.

Referring to FIG. 8, as in the first embodiment, the workpiece was pierced by the laser beam at the piercing point 1 on the hole circumference 3 and then cut along the circumference 3 up to point b adjacent to the cutting end point. In this case, the laser cutting conditions (hereinafter referred to as the "first laser cutting conditions") were set as follows: laser output of 1,750 W, pulse peak output of 2,800 W, pulse frequency of 1,300 Hz, duty cycle of 65%, cutting speed of 1,000 mm/min, focus position of +1.5 mm, and cutting gas (nitrogen gas) pressure of 0.7 kg/cm².

Subsequently, said laser cutting conditions were switched to laser cutting conditions (hereinafter referred to as the "second laser cutting conditions") consisting of: laser output of 500 W, pulse peak output of 2,800 W, pulse frequency of 20 Hz, duty cycle of 20%, cutting speed of 100 mm/min, focus position of +1.5 mm, and cutting gas (nitrogen gas) pressure of 0.7 kg/cm² at point b adjacent to the cutting end point on the circumference 3, and the workpiece was laser cut up to the cutting end point or point c (=point a).

In particular, the workpiece was laser cut from point b adjacent to the cutting end point to point c (=point a) or the cutting end point on the circumference 3, with the pulse peak output, cutting gas pressure and focus position in the second laser cutting conditions, or the laser cutting conditions under which the workpiece is laser cut from point b adjacent to the cutting end point to point c (=point a) or the cutting end point on the circumference 3, being set to the same values as the pulse peak output, cutting gas pressure and focus position in the first laser cutting conditions, or the laser cutting conditions under which the workpiece is laser cut from said piercing point 1 to point b adjacent to the cutting end point, respectively, and with the laser output, pulse frequency, duty cycle and cutting speed in said second laser cutting conditions being set to smaller values than the laser output, pulse frequency, duty cycle and cutting speed in said first laser cutting conditions, respectively.

Apart from the above-mentioned items which are identical to those of the first embodiment, said laser cutting was carried out in the present fifth embodiment with the laser cutting condition switching position b shifted by circumferential distance 1 from the cutting end point c in FIG. 8, and the plate thickness of the workpiece where the 30 mm-diameter hole is to be cut (soft steel material, e.g., SS400), changed from 3.2 mm to 6 mm to 9 mm to 12 mm.

Figure 9:
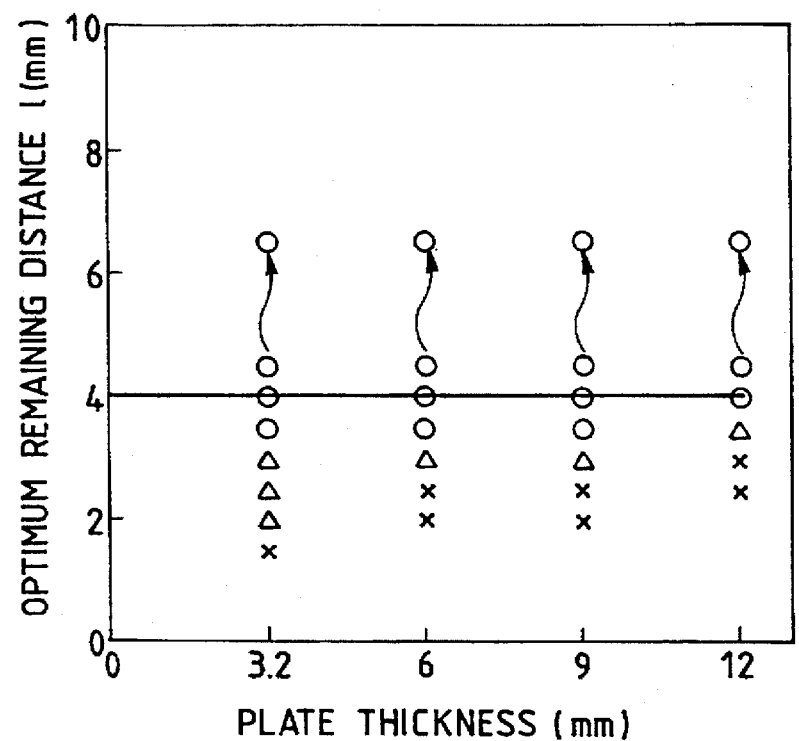
FIG. 9 is a diagram showing an optimum remaining distance for several plate thicknesses according to the fifth embodiment of the present invention.

FIG. 9 shows the results of said cutting. In FIG. 9, the horizontal axis represents the plate thickness, the vertical axis represents the optimum remaining distance 1 thus obtained (remaining distance over which the cutting groove width before and after the laser cutting condition switching position does not change in the shortest hole cutting time), and mark ○ indicates the that chipping did not occur adjacent to the cutting end point, mark a indicates that small chipping took place adjacent to the cutting end point, and mark x indicates that large chipping occurred adjacent to the cutting end point.

As is apparent from FIG. 8, the result obtained was that the optimum remaining distance (i.e., the remaining distance over which the cutting groove width before and after the laser cutting condition switching position does not change in the shortest time for cutting the hole) for hole cutting having a cutting path without a piercing line, was approximately 1=4 mm.

It is to be noted that though not shown, no chipping was found adjacent to the cutting end point if the optimum remaining distance was set to approximately 1=4 mm when circular holes having diameters of 16 mm, 20 mm and other diameters and other holes of complicated shapes, such as a triangle, a square and a rhombus, were cut in soft steel materials, e.g., SS400, of each plate thickness under said laser cutting conditions in the hole cutting which has the cutting path without the so-called piercing line and is started from the point on the hole circumference 3.

Embodiment 6

Figure 11:
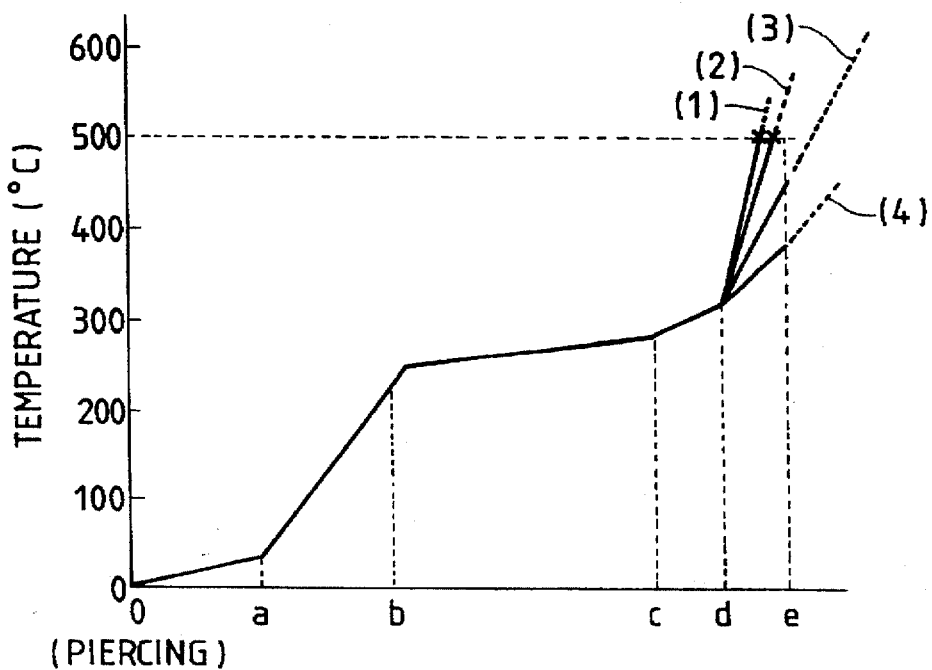
FIG. 11 is a diagram showing the results of temperature measurements adjacent to a cutting end point according to a change in pulse frequency.

A sixth embodiment of the present invention will now be described with reference to FIGS. 10 and 11. In the present sixth embodiment, a desired minimum hole dimension (e.g. a diameter if the hole to be cut is a circle, the length of a single side if the hole to be cut is a square, and the length of a shorter side if the hole to be cut is a rectangular) is less than or equal to the plate thickness of a workpiece.

Figure 10A:
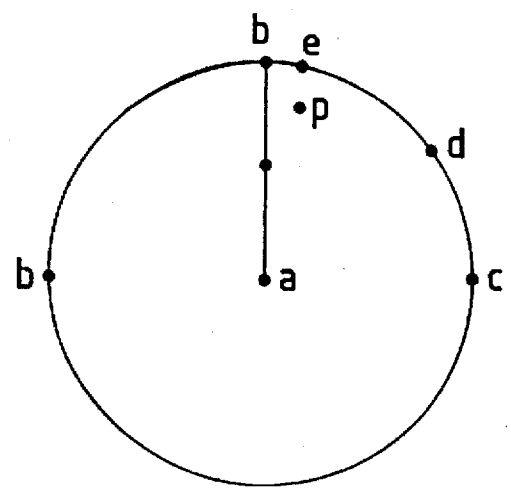
FIGS. 10(a) and 10(b) are diagrams illustrating a laser cutting method according to a sixth embodiment of the present invention.
Figure 10B:
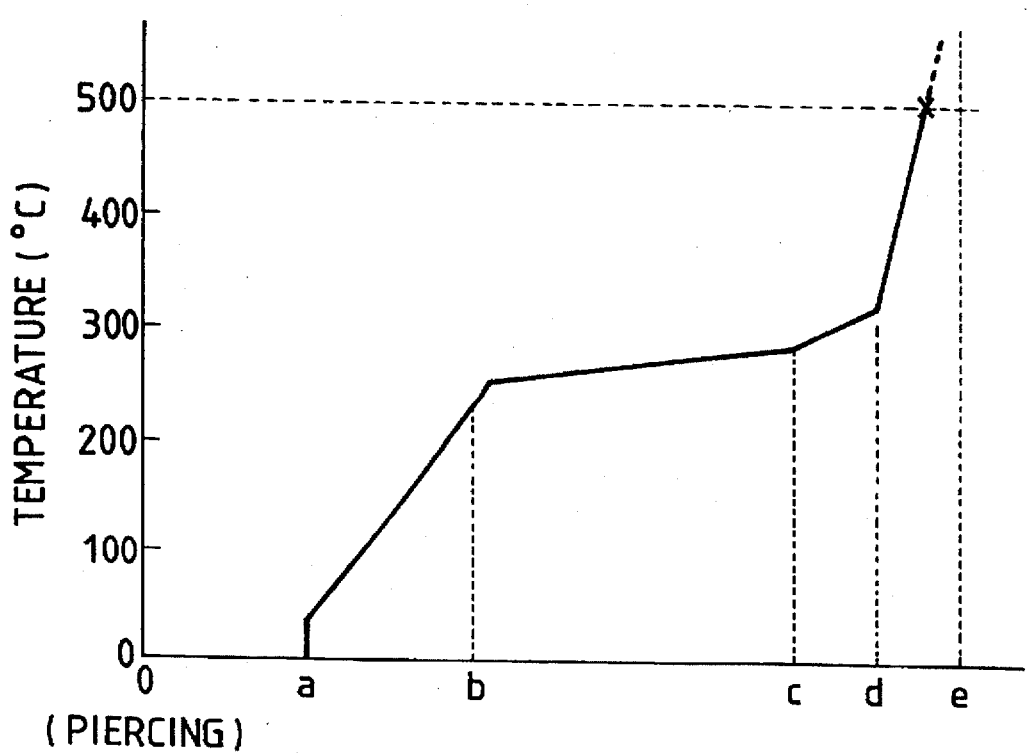
Figure 12A:
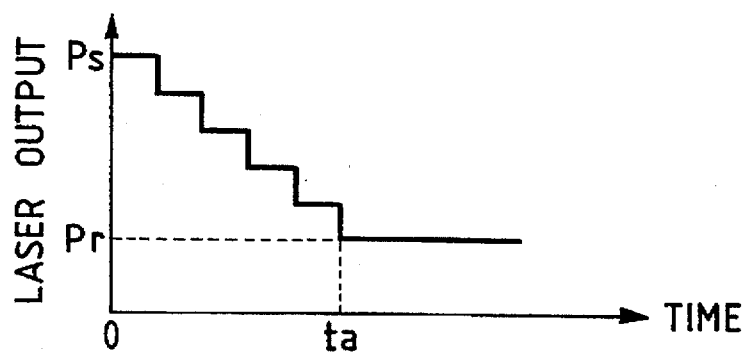
FIGS. 12(a) to 12(d) are diagrams illustrating a laser cutting method according to a seventh embodiment of the present invention.
Figure 12B:
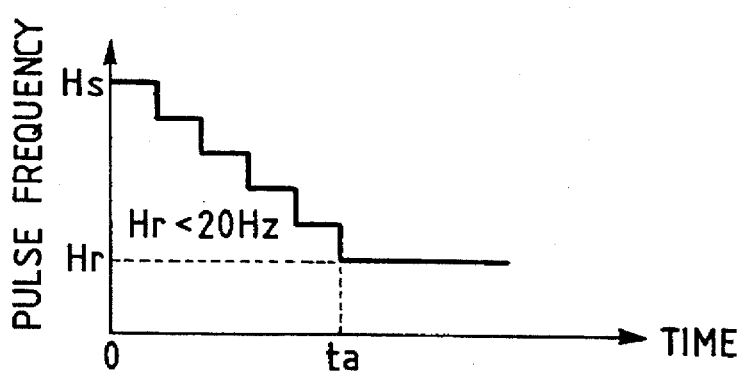
Figure 12C:
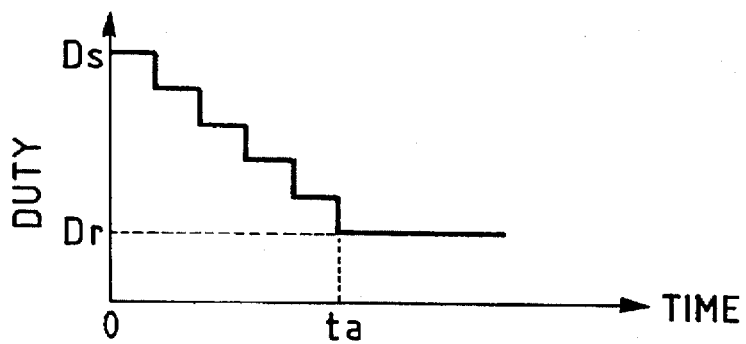
Figure 12D:
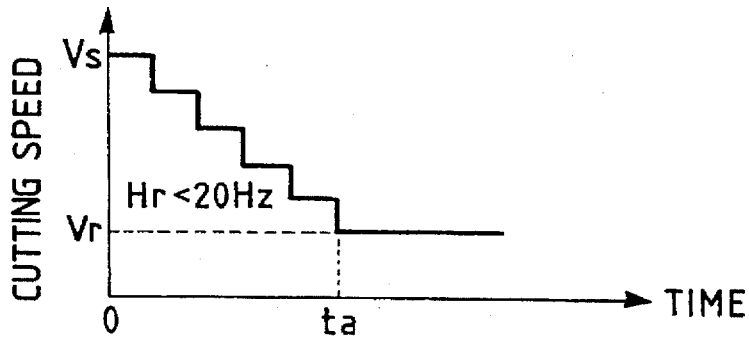

FIG. 10 shows an example of cutting a 10 mm-diameter circular hole, smaller than or equal to the plate thickness of a workpiece, in a soft steel material, e.g., SS400, of 12 mm plate thickness as well as the results of measuring temperature at point P adjacent to the cutting end point. It is to be noted that the laser cutting conditions were set as follows: laser output of 1,750 W, pulse peak output of 2,800 W, pulse frequency of 1,300 Hz, duty cycle of 65%, cutting speed of 1,000 mm/min, focus position of +1.5 mm, and cutting gas (nitrogen gas) pressure of 0.7 kg/cm$^2$. FIG. 10(a) shows the shape of the hole to be cut and the position of the temperature measurements. FIG. 10(b) shows the results of the temperature measurement. In FIG. 10, temperature rises smoothly from the start of the cut to the completion of the base material piercing, i.e., from 0 to a. Then, from the completion of piercing to cutting along the piercing line up to the circumference, or from a to b, temperature further rises because the laser beam approaches the measuring point P, however, from b to c to d where the laser beam moves away from the measuring point P once and then again approaches the measuring point P, temperature transmitted to point P almost stabilizes, resulting in a smooth temperature ramp again.

Next, in region d-e, as shown, temperature rises abruptly again, resulting in a remarkable chipping phenomenon at a point marked x (i.e., when temperature at point P=approximately 500° C.) in this region d-e. In said region d-e, it is presumed that temperature is liable to rise considerably because the laser beam approaches the measuring point P again and also because the heat capacity of the base material is extremely low at point P adjacent to the cutting end point.

In the mean time, a point 4 mm short of the cutting end point was selected as point d and it was attempted to change the laser cutting conditions at point d to prevent chipping from occurring at the cutting end point due to the temperature rising abruptly to nearly 500° C. again at point e or the cutting end point in the next process or region d-e in the cutting performed only under said laser cutting conditions shown in FIG. 10. FIG. 11 shows the results of measuring temperature at point P adjacent to the cutting end point when the pulse frequency was changed, with the fundamental pulse output conditions to be switched to being: laser output of 500 W, pulse peak output of 2,800 W, duty cycle of 20%, cutting speed of 20 mm/min, focus position of +1.5 mm, and cutting gas (nitrogen gas) pressure of 0.7 kg/cm$^2$, (1) indicates a temperature change at the pulse frequency of 150 Hz, (2) a change at the pulse frequency of 70 Hz, (3) a change at the pulse frequency of 20 Hz, and (4) a change at the pulse frequency of 5 Hz. In FIG. 11, while chipping occurred at the large pulse frequencies at a point marked x where temperature at point P is around 500° C., a chipping phenomenon was not found and excellent cutting was done in which the pulse frequencies were set to 20 Hz and less.

Incidentally, since cutting and separation requires two holes cut by two adjacent pulses to overlap with each other in cutting by pulse output, cutting speed F must satisfy Expression 1 to enable cutting and separation.

Because the diameter of a hole cut by the laser beam w≈0.42 mm and the pulse frequency fp is 20 Hz in said cutting, the cutting speed F must be 8.4 mm/sec or less, i.e., approximately 500 mm/min or less, according to the following expression:

$$F \leq w/T = w/(1/fp) = w \cdot fp \quad (1)$$

where

F=cutting speed (mm/sec)

w=diameter of hole to be cut by laser beam (mm)

T=pulse period (sec)

fp=pulse frequency (Hz)

As described above, if the minimum dimension of the desired hole is less than or equal to the plate thickness of the workpiece, it was found that chipping at the cutting end point could be prevented and excellent cutting could be carried out by cutting the workpiece at the cutting speed of approximately 500 mm/min or less by using the pulse output at the pulse frequency of approximately 20 Hz or less as the pulse cutting condition under which the workpiece was cut in the remaining distance region adjacent to the cutting end point on the hole circumference.

It is to be noted that though not shown, no chipping was found adjacent to the cutting end point if the workpiece was cut at the cutting speed of 500 mm/min or less by using the pulse output at the pulse frequency of approximately 20 Hz or less as the pulse cutting condition under which the workpiece was cut in the remaining distance region adjacent to the cutting end point on the hole circumference when circular holes of 8 mm, 9 mm and other diameters and other holes of complicated shapes, such as a triangle, a square and a rhombus, were cut in soft steel materials, e.g., SS400, of 12 mm plate thickness under said laser cutting conditions in the hole cutting where the minimum dimension of the desired hole (e.g., a diameter if the hole to be cut is a circle, the length of a single side if the hole to be cut is a square, and the length of a shorter side if the hole to be cut is rectangular) was approximately less than or equal to the plate thickness of the workpiece.

Embodiment 7

In any of said first to sixth embodiments wherein the laser output, pulse frequency, duty cycle and cutting speed in the laser cutting conditions were changed abruptly at the point of switching from said first laser cutting conditions for cutting the workpiece up to the point the predetermined distance short of the cutting end point on the hole circumference to said second laser cutting conditions for cutting the workpiece between the cutting end point on the hole circumference and the point the predetermined distance short of said cutting end point, changing the laser output, pulse frequency, duty cycle and cutting speed as shown in FIG. 12 allowed said switching to be done smoothly.

FIG. 12 illustrates a cutting method according to a seventh embodiment of the present invention and shows how the laser output (a), pulse frequency (b), duty cycle (c) and cutting speed (d) decrease in a step pattern. The laser output, pulse frequency, duty cycle and cutting speed (Ps, Hs, Ds, Vs) in the first laser cutting conditions for cutting the workpiece up to the point the predetermined distance short of the cutting end point on the hole circumference were reduced at the point of switching from the first laser cutting conditions to the second laser cutting conditions ta in a step or linear pattern simultaneously or separately to match the laser output, pulse frequency, duty cycle and cutting speed (PE, HE, DE, VE) in the second laser cutting conditions. It is to be understood that the laser output, pulse frequency, duty cycle and cutting speed (Ps, Hs, Ds, Vs) in the first laser cutting conditions in the present embodiment were set to 1,750 W, 1,300 Hz, 65% and 1,000 mm/min, respectively, with the pulse peak output, focus position and cutting gas (nitrogen gas) pressure set to 2,800 W, +1.5 mm and 0.7 kg/cm$^2$, respectively, and further the laser output, pulse frequency, duty cycle and cutting speed (PE, HE, DE, VE) in the second laser cutting conditions were set to 500 W, 20 Hz, 20% and 100 mm/min, respectively, with the pulse peak output, focus position and cutting gas (nitrogen gas) pressure set to 2,800 W, +1.5 mm and 0.7 kg/cm$^2$, respectively.

By changing the laser output, pulse frequency, duty cycle and cutting speed as described above at the time of switching from the first laser cutting condition to the second laser cutting condition, the switching from the first laser cutting condition to the second laser cutting condition could be done smoothly.

It is to be noted that although not shown, it has been confirmed by experiments that the switching from the first laser cutting condition to the second laser cutting condition could also be done comparatively smoothly if at least one of the laser output, pulse frequency, duty cycle and cutting speed is changed at the time of switching from the first laser cutting condition to the second laser cutting condition.

Embodiment 8

In any of the third to seventh embodiments wherein pulse peak output, cutting gas pressure, and focus position in the second laser cutting conditions are set to be the same as the corresponding ones in the first laser cutting conditions, as shown in the second embodiment, it is confirmed by experiments that chipping is hardly found near the cutting end point even if only focus position in the second laser cutting conditions in the third to seventh embodiment is set to be the same as focus position in the first laser cutting conditions.

Embodiment 9

Finally, a laser cutting control apparatus embodying the cutting method in each of said embodiments will be described with reference to FIG. 13. FIG. 13 is a flow chart for explaining the operations of a laser cutting control apparatus which embodies the cutting method in each of said embodiments.

This laser cutting control apparatus inputs cutting path information, such as a cutting path, the presence/absence of the piercing line, and the magnitude of the corner radius R set by the piercing line from the piercing point onto the circumference input by the NC processing program as follows. (The input NC processing program)

N1 G90

N2 G92X0.Y0.

N3 M98P9010 (piercing command)

N4 G01G41Y11.619 (piercing line (straight line))

N5 G03X-3.75Y14.524I-3 (corner R 3 mm)

N6 G0313.75J-14.524 (a cutting end point c)

N7 M121 (end command)

N8 M30 (end code)

The apparatus inputting this information recognizes the presence/absence of a piercing line (step 1), the piercing line corner radius R (step 2), and the coordinates of the end point c (step 3), and further inputs the first laser cutting conditions used from a starting point to a point a distance short of a point into said processing program (step 4).

Next, the presence/absence of a piercing line is recognized in step 5, when the absence of the piercing line is recognized, a point 4 mm short of the already recognized cutting end point c (1=4 mm) is provisionally set up to be a point b where the laser conditions are switched (step 12, step 8).

In step 5, if the presence of a piercing line is recognized, it is determined whether the piercing line corner R is R≧1 mm. In step 6, if R is not R≧1 mm, a point 4 mm short of the already recognized end point c (1=4 mm) is provisionally set up to be a point b where the laser conditions are switched (step 12, step 8).

In step 6, when the piercing line corner R is R≧1 mm, a point 4×Rmm short of the already recognized point c (1=4× Rmm) is provisionally set up to be a point b where the laser cutting conditions is switched (step 7, step 8).

Next, in step 9, a distance between the already recognized point c and a provisional set up point b is judged by whether 1=4 mm or 1=4×R mm, or not. If the distance is 1 =4 mm or 1=4×Rmm, the provisional point b is set up to be a point b where the laser cutting conditions are switched in the processing program in step 10.

If the distance is not 1=4 mm or 1=4×Rmm, a provisional point b is chosen so that the distance is 1=4 mm or 1=4×Rmm in step 13, and a practical point b is set up into the processing program in step 10.

Finally, the second laser cutting conditions which are used from the switching point b to the cutting end point are entered into the processing program (step 11), and the input NC program is converted to an NC processing program as follows.

(The converted NC processing program)

N1 G90

N2 G92X0.Y0.

N3 M98P9010 (piercing command)

N4 M103 (a first laser cutting conditions)

N5 G01G41Y11.619 (piercing line (straight line))

N6 G03X-3.75Y14.524I-3 (corner R 3 mm)

N7 G03X10.998Y10.213.75J-14.524 (a switching point b)

N8 M102 (a second laser cutting conditions)

N9 G0313.75J-14.524 (a cutting end point c)

N10 M121 (end command)

N11 M30 (end code)

The present invention has been described in connection with the preferred embodiments, but is in not intended to be limited only to the above-described embodiments.

What is claimed is:

1. A laser cutting method for laser cutting a metallic material workpiece to form a hole in said workpiece, said hole having a desired shape, comprising the steps of:

cutting said workpiece up to a point a predetermined distance from a cutting end point on a circumference of said hole according to first laser cutting conditions;

cutting said workpiece between said point a predetermined distance from said cutting end point and said cutting end point according to second laser cutting conditions, said second laser cutting conditions being different from said first laser cutting conditions, wherein a focus position in said second laser cutting conditions is the same as a focus position in said first laser cutting conditions.

2. The laser cutting method as defined in claim 1, further comprising the step of reducing, when said first laser cutting conditions are switched to said second laser cutting conditions, at least one of laser output, pulse frequency, duty cycle and cutting speed in said first laser cutting conditions in a linear or step pattern so as to be identical to at least a corresponding one of laser output, pulse frequency, duty cycle and cutting speed in said second laser cutting conditions.

3. The laser cutting method as defined in claim 1, further comprising the step of starting the cutting of said hole from a piercing line, said piercing line being in contact with said circumference of said hole and forming an arc having a radius (R) of 1 mm or more, and switching said first laser cutting conditions to said second laser cutting conditions a circumferential distance of approximately 4×R from said cutting end point on said hole circumference.

4. The laser cutting method as defined in claim 1, further comprising the step of starting the cutting of said hole from a piercing line, said piercing line being one of in contact with said circumference of said hole and forming an arc having a radius of less than 1 mm, connected linearly with said circumference of said hole at a predetermined angle, and connected with a point on said hole circumference, and switching said first laser cutting conditions to said second laser cutting conditions a circumferential distance of approximately 4 mm from said cutting end point on said hole circumference.

5. The laser cutting method as defined in claim 1, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$$F \leq w/T = w/(1/fp) = w \cdot fp$$

where

F=cutting speed (mm/sec)

w=diameter of hole to be cut by the laser beam (mm)

T=pulse period (sec)

fp=pulse frequency (Hz).

6. The laser cutting method as defined in claim 1, wherein said workpiece is soft steel.

7. The laser cutting method as defined in claim 2, further comprising the step of starting the cutting of said hole from a piercing line, said piercing line being in contact with said circumference of said hole and forming an arc having a radius (R) of 1 mm or more, and switching said first laser cutting conditions to said second laser cutting conditions a circumferential distance of approximately 4×R from said cutting end point on said hole circumference.

8. The laser cutting method as defined in claim 2, further comprising the step of starting the cutting of said hole from a piercing line, said piercing line being one of in contact with said circumference of said hole and forming an arc having a radius of less than 1 mm, connected linearly with said circumference of said hole at a predetermined angle, and connected with a point on said hole circumference, and switching said first laser cutting conditions to said second laser cutting conditions a circumferential distance of approximately 4 mm from said cutting end point on said hole circumference.

9. The laser cutting method as defined in claim 2, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$$F \leq w/T = w/(1/fp) = w \cdot fp$$

where

F=cutting speed (mm/sec)

w=diameter of hole to be cut by the laser beam (mm)

T=pulse period (sec)

fp=pulse frequency (Hz).

10. The laser cutting method as defined in claim 3, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$$F \leq w/T = w/(1/fp) = w \cdot fp$$

where

F=cutting speed (mm/sec)

w=diameter of hole to be cut by the laser beam (mm)

T=pulse period (sec)

fp=pulse frequency (Hz).

11. The laser cutting method as defined in claim 4, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$$F \leq w/T = w/(1/fp) = w \cdot fp$$

where

F=cutting speed (mm/sec)

w=diameter of hole to be cut by the laser beam (mm)

T=pulse period (sec)

fp=pulse frequency (Hz).

12. The laser cutting method as defined in claim 7, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$$F \leq w/T = w/(1/fp) = w \cdot fp$$

where

F=cutting speed (mm/sec)

w=diameter of hole to be cut by the laser beam (mm)

T=pulse period (sec)

fp=pulse frequency (Hz).

13. The laser cutting method as defined in claim 8, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$$F \leq w/T = w/(1/fp) = w \cdot fp$$

where

F=cutting speed (mm/sec)

w=diameter of hole to be cut by the laser beam (mm)

T=pulse period (sec)

fp=pulse frequency (Hz).

14. A laser cutting method for laser cutting a metallic material workpiece to form a hole in the workpiece, the hole having a desired shape, comprising the steps of:

cutting said workpiece up to a point a predetermined distance from a cutting end point on a circumference of said hole according to first laser cutting conditions;

cutting said workpiece between said point a predetermined distance from said cutting end point and said cutting end point according to second laser cutting conditions, said second laser cutting conditions being different from said first laser cutting conditions, wherein at least one of pulse peak output, cutting gas pressure and focus position in said second laser cutting conditions is the same as at least a corresponding one of pulse peak output, cutting gas pressure and focus position in said first laser cutting conditions.

15. The laser cutting method as defined in claim 14, further comprising the steps of reducing, when said first laser cutting conditions are switched to said second laser cutting conditions, at least one of laser output, pulse frequency, duty cycle and cutting speed in said first laser cutting conditions in a linear or step pattern so as to be identical to at least a corresponding one of laser output, pulse frequency, duty cycle and cutting speed in said second laser cutting conditions.

16. The laser cutting method as defined in claim 14, further comprising the step of starting the cutting of said hole from a piercing line, said piercing line being in contact with said circumference of said hole and forming an arc having a radius (R) of 1 mm or more, and switching said first laser cutting conditions to said second laser cutting conditions a circumferential distance of approximately 4×R from said cutting end point on said hole circumference.

17. The laser cutting method as defined in claim 14, further comprising the step of starting the cutting of said hole from a piercing line, said piercing line being one of in contact with said circumference of said hole and forming an arc having a radius of less than 1 mm, connected linearly with said circumference of said hole at a predetermined angle, and connected with a point on said hole circumference, and switching said first laser cutting conditions to said second laser cutting conditions a circumferential distance of approximately 4 mm from said cutting end point on said hole circumference.

18. The laser cutting method as defined in claim 14, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$F \leq w/T = w/(1/fp) = w \cdot fp$ where

F=cutting speed (mm/sec)
w=diameter of hole to be cut by the laser beam (mm)
T=pulse period (sec)
fp=pulse frequency (Hz).

19. The laser cutting method as defined in claim 14, wherein said workpiece is soft steel.

20. The laser cutting method as defined in claim 15, further comprising the step of starting the cutting of said hole from a piercing line, said piercing line being in contact with said circumference of said hole and forming an arc having a radius (R) of 1 mm or more, and switching said first laser cutting conditions to said second laser cutting conditions a circumferential distance of approximately 4×R from said cutting end point on said hole circumference.

21. The laser cutting method as defined in claim 15, further comprising the step of starting the cutting of said hole from a piercing line, said piercing line being one of in contact with said circumference of said hole and forming an arc having a radius of less than 1 mm, connected linearly with said circumference of said hole at a predetermined angle, and connected with a point on said hole circumference, and switching said first laser cutting conditions to said second laser cutting conditions a circumferential distance of approximately 4 mm from said cutting end point on said hole circumference.

22. The laser cutting method as defined in claim 15, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$F \leq w/T = w/(1/fp) = w \cdot fp$ where

F=cutting speed (mm/sec)
w=diameter of hole to be cut by the laser beam (mm)
T=pulse period (sec)
fp=pulse frequency (Hz).

23. The laser cutting method as defined in claim 4, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$F \leq w/T = w/(1/fp) = w \cdot fp$ where

F=cutting speed (mm/sec)
w=diameter of hole to be cut by the laser beam (mm)
T=pulse period (sec)
fp=pulse frequency (Hz).

24. The laser cutting method as defined in claim 17, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$F \leq w/T = w/(1/fp) = w \cdot fp$ where

F=cutting speed (mm/sec)
w=diameter of hole to be cut by the laser beam (mm)
T=pulse period (sec)
fp=pulse frequency (Hz).

25. The laser cutting method as defined in claim 20, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$$F \leq w/T = w/(1/fp) = w \cdot fp$$

where

F=cutting speed (mm/sec)

w=diameter of hole to be cut by the laser beam (mm)

T=pulse period (sec)

fp=pulse frequency (Hz).

26. The laser cutting method as defined in claim 21, wherein if a minimum dimension of said hole to be formed by laser cutting is approximately less than or equal to the thickness of said workpiece, a pulse frequency in said second laser cutting conditions is approximately 20 Hz or less and a cutting speed in said second laser cutting conditions satisfies the following equation:

$$F \leq w/T = w/(1/fp) = w \cdot fp$$

where

F=cutting speed (mm/sec)

w=diameter of hole to be cut by the laser beam (mm)

T=pulse period (sec)

fp=pulse frequency (Hz).

27. A laser cutting apparatus, comprising:

means for recognizing the presence of a piercing line in contact with the circumference of a hole to be formed by laser cutting at an arc of 1 mm or more radius (R) on the basis of cutting path information, means for determining a point of a circumferential distance approximately 4×R short of cutting end point on said hole circumference, said point being a switching point for switching first laser cutting conditions to second laser cutting conditions, and means for automatically allocating said first laser cutting conditions and second laser cutting conditions relative to said switching point.

28. A laser cutting apparatus, comprising:

first means for determining the presence of a piercing line in contact with the circumference of a hole to be formed by laser cutting at an arc of less than 1 mm radius (R), the presence of a piercing line connected linearly with said circumference of said hole at a predetermined angle, and whether cutting of said hole is started from a point on said hole circumference;

second means for detecting a point of a circumferential distance approximately 4 mm short of the cutting end point on said hole circumference, said point being a switching point for switching first laser cutting conditions to second laser cutting conditions, when said first determining means determines one of the presence of a piercing line in contact with the circumference of said hole at an arc of less than 1 mm radius (R), the presence of a piercing line connected linearly with said circumference of said hole at a predetermined angle, and whether cutting of said hole is started from a point on said hole circumference; and means for automatically allocating said first laser cutting conditions and second laser cutting conditions relative to said switching point.

29. A laser cutting method for laser cutting a metallic material workpiece to form a hole in said workpiece, said hole having a desired shape, comprising the steps of:

cutting said workpiece up to a point a predetermined distance from a cutting end point on a circumference of said hole according to first laser cutting conditions;

cutting said workpiece between said point a predetermined distance from said cutting end point and said cutting end point on said circumference of said hole according to second laser cutting conditions such that damage to the workpiece is minimized;

wherein the laser cutting according to said first laser cutting conditions forms a first groove in said workpiece having a first width, and the laser cutting according to said second laser cutting conditions forms a second groove in said workpiece having a second width, and said second width is substantially the same as said first width.

30. The laser cutting method according to claim 29, wherein said damage to said workpiece is a chipping of the workpiece along said circumference of said hole.

31. The laser cutting method according to claim 29, wherein said workpiece is soft steel.

32. The laser cutting method according to claim 30, wherein said chipping of said workpiece is eliminated.

33. The laser cutting method according to claim 29, wherein a difference in width between said first groove and said second groove is less than 0.2 mm.

* * * * *